(12) United States Patent
Richey et al.

(10) Patent No.: US 7,941,198 B2
(45) Date of Patent: May 10, 2011

(54) INTERNAL AUDIO MULTIPLEXING SYSTEM FOR MULTI-CHANNEL RADIOS

(75) Inventors: Manuel F. Richey, Paola, KS (US); Phillip G Holloway, West Plains, MO (US); Zachary R. Nelson, Fulton, MO (US); Jeffrey K. Hunter, Olathe, KS (US); Michael P Ramsey, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 719 days.

(21) Appl. No.: 11/968,601

(22) Filed: Jan. 2, 2008

(65) Prior Publication Data

US 2009/0170578 A1 Jul. 2, 2009

(51) Int. Cl.
*H04B 1/00* (2006.01)
(52) U.S. Cl. ........... 455/701; 455/68; 455/70; 455/3.01; 455/552.1; 455/569.1
(58) Field of Classification Search .................. 455/701, 455/68, 70, 3.01, 3.06, 552.1, 569.1
See application file for complete search history.

(56) References Cited

U.S. PATENT DOCUMENTS

| | | | |
|---|---|---|---|
| 4,027,249 A | 5/1977 | Calman | |
| 5,495,283 A | 2/1996 | Cowe | |
| 5,708,662 A | 1/1998 | Takashima | |
| 6,055,419 A | 4/2000 | Beard | |
| 6,169,894 B1 | 1/2001 | McCormick et al. | |
| 6,397,076 B1 | 5/2002 | Brown et al. | |
| 7,324,003 B2 | 1/2008 | Yun | |
| 7,330,693 B1 | 2/2008 | Goss | |
| 2005/0191958 A1 | 9/2005 | Hoskins | |
| 2007/0030585 A1 | 2/2007 | Gibson et al. | |
| 2007/0173293 A1* | 7/2007 | Tran | 455/569.1 |
| 2010/0203830 A1* | 8/2010 | Warren et al. | 455/41.2 |

OTHER PUBLICATIONS

"Flightell Pro", "http://satphone.co.uk/networks/iridium/aviation_equipment.shtml", 2007, pp. 1-2, Publisher: SATPHONE.CO.UK.
"G1000 Audio Panel Pilot's Guide", Dec. 2004, pp. 1-20, Publisher: Garmin.
"Intercoms", "http://www.avionix.com/store/intercom.html", 2007, pp. 1-6, Publisher: Eastern Avionics International, Inc.
"PMA8000B Audio Panel", "http://www.aircraftspruce.com/catalog/avpages/pma8000b.php", 1995, pp. 1-2, Publisher: Aircraft Spruce & Specialty Co.
"Sigtronics", "http://www.chiefaircraft.com/airsec/Aircraft/Intercoms/Sigtronics.html", May 2007, pp. 1-5, Publisher: Chief Aircraft Inc.

* cited by examiner

*Primary Examiner* — Sanh D Phu
(74) *Attorney, Agent, or Firm* — Fogg & Powers LLC

(57) ABSTRACT

A method of providing audio transmissions from an electronic device having internal audio multiplexing is disclosed. The method comprises combining a plurality of received audio input signals for output as a first mode of operation for the electronic device, where the electronic device is configured to output the plurality of audio input signals on at least one audio channel. When a priority audio signal is detected from one of the received audio input signals in the first mode of operation, the method interrupts playback of the remaining audio input signals with the priority audio signal as a second mode of operation for the electronic device and transfers, within the electronic device, the priority audio signal to the at least one audio channel once the priority audio signal is detected.

18 Claims, 3 Drawing Sheets

INTERNAL AUDIO MULTIPLEXING SYSTEM FOR MULTI-CHANNEL RADIOS

RELATED APPLICATION

This application is related to commonly assigned U.S. patent application Ser. No. 11/196,303, filed on Aug. 4, 2005 and entitled "AUDIO SYSTEMS AND METHODS" (the '303 application). The '303 application is incorporated herein by reference.

BACKGROUND

Some conventional audio systems include a transceiver capable of receiving and transmitting audio signals on a first frequency and receiving audio signals on a second frequency. Such systems include a device for broadcasting the received audio signals. In such conventional systems, a user may not be aware of a change in source of the audio signals being output by the system.

For example, in a typical aviation communications system, hardware-defined radios provide audio output to a communications receiver over at least one audio channel. In most implementations, a cockpit audio panel controls a plurality of audio channels for simultaneous or individual audio messaging during a flight. For example, if a pilot experiences an extended period of time committed to cross country flights where little to no air communication takes place, it becomes dangerous to not continually listen for safety-critical message transmissions. Moreover, if the pilot is listening to a secondary audio channel, the pilot may not pay close attention to the audio being output. For example, if audio signals from a control tower are subsequently received and output by the audio panel on a primary channel, the pilot does not immediately detect the change in the audio source. As a result, the pilot will likely miss the safety-critical information.

For the reasons stated above and for other reasons stated below which will become apparent to those skilled in the art upon reading and understanding the present specification, there is a need in the art for improvements in multi-channel radios used in aviation communications systems.

SUMMARY

The following specification discloses an internal audio multiplexing system for multi-channel radios. This summary is made by way of example and not by way of limitation. It is merely provided to aid the reader in understanding some aspects of at least one embodiment described in the following specification.

Particularly, in one embodiment, a method of providing audio transmissions from an electronic device having internal audio multiplexing comprises combining a plurality of received audio input signals for output as a first mode of operation for the electronic device, where the electronic device is configured to output the plurality of audio input signals on at least one audio channel. When a priority audio signal is detected from one of the received audio input signals in the first mode of operation, the method interrupts playback of the remaining audio input signals with the priority audio signal as a second mode of operation for the electronic device and transfers, within the electronic device, the priority audio signal to the at least one audio channel once the priority audio signal is detected.

DRAWINGS

These and other features, aspects, and advantages are better understood with regard to the following description, appended claims, and accompanying drawings where:

Like reference characters denote like elements throughout the figures and text of the specification.

DETAILED DESCRIPTION

Figure 1:
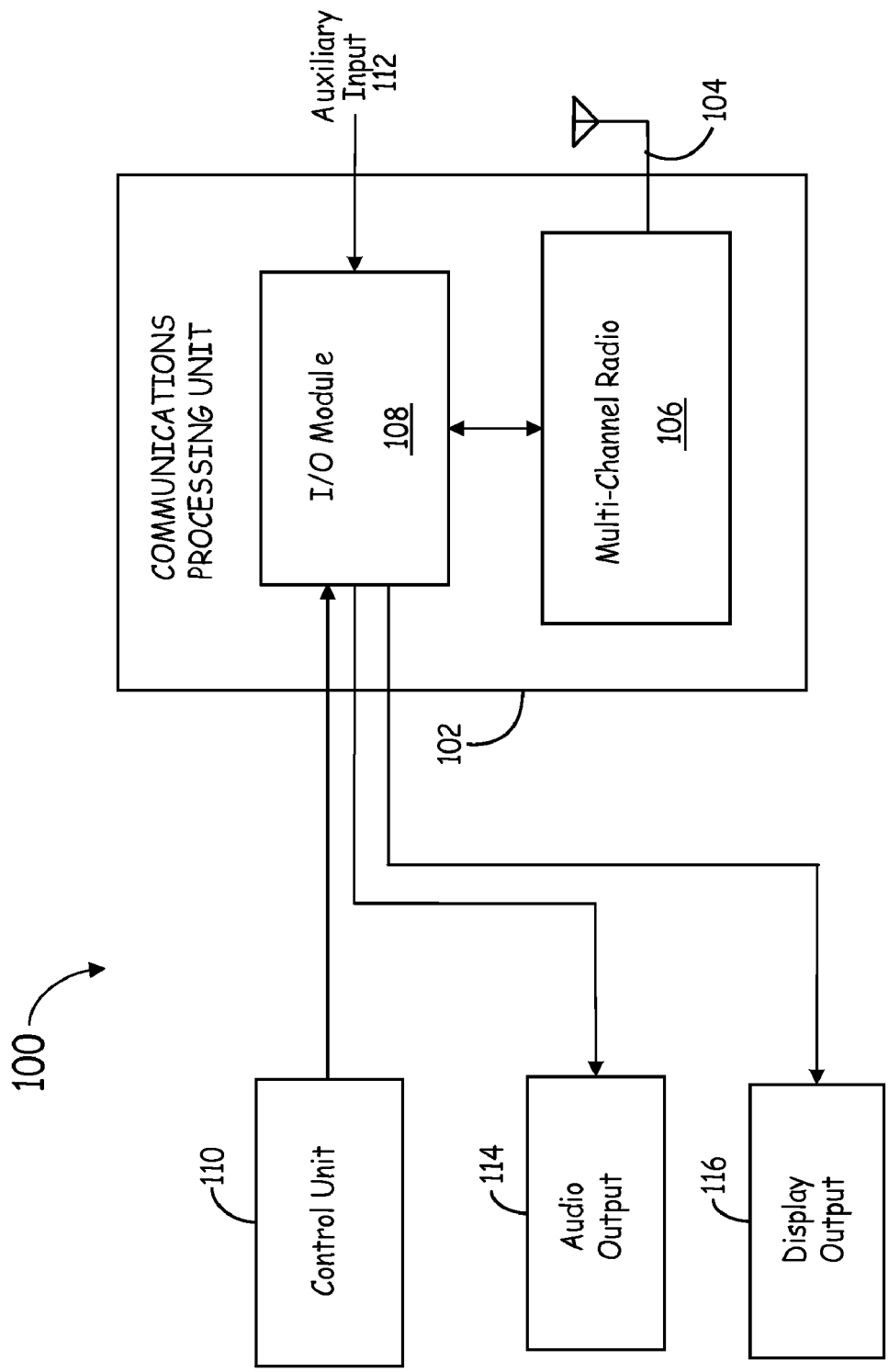
FIG. 1 is a block diagram of a communications system having internal audio multiplexing.

Embodiments disclosed herein relate to an internal audio multiplexing system for multi-channel radios that allows a user to listen to other information sources while still providing the capability of hearing safety-critical transmissions. In at least one embodiment, the internal audio multiplexing is accomplished within the radio using internal squelch and audio channel summing modules. For purposes of this description, any electronic module operable to suppress audio (or video) output from the radio in the absence of a sufficiently strong input signal is considered a squelch module. For example, the internal squelch module "breaks squelch" by allowing input signals above a signal strength threshold to be broadcast.

The multiplexing system discussed herein includes a multi-channel radio with an auxiliary audio input together with an internal recorder and playback memory for recording or delaying received audio transmissions. For example, a multi-channel aviation radio or similar audio management unit contains one or more audio output channels that are summed and interrupted based on the squelch breaks of a primary channel internal to the radio. In one implementation, the multi-channel aviation radio is configured to output the summed audio from the primary channel, the auxiliary audio input (for example, a portable audio player), audio signals from one or more secondary communication channels (in the case of the multi-channel aviation radio), and the internal audio recording previously described. The multi-channel aviation radio is further operable to sum the audio from these various sources in a monitor mode with the added capability of placing only the audio from the primary channel on the audio output port when the primary channel breaks squelch. By including the squelch, the audio input combining, and the recorder modules within the multi-channel aviation radio, the transition to the primary channel can occur substantially simultaneously.

At least one embodiment of the multiplexing system discussed herein represents a priority mode that is very useful for aviation applications. The priority mode allows a pilot to perform background tasks or listen to background channels without missing safety-critical messages (for example, from an air traffic controller, or the like). Furthermore, the primary channel can be listened to without interference from the additional audio sources discussed above. The additional audio sources will not be summed into the audio output when the primary channel breaks squelch.

In one example embodiment, the multi-channel aviation radio is operable to record the most recent audio transmissions received on the primary channel. For example, the audio recordings are kept in a circular queue where the oldest is discarded when a newer audio transmission is received. In addition, commands to playback recorded messages, suspend recording, and resume recording are also provided to control the recording mechanism at an operator's discretion. In one implementation, the playback audio is interrupted by the audio from the primary channel whenever the primary channel breaks squelch. Moreover, audible tones can be inserted in the audio transmission to alert the pilot of a priority interrupt, similar to the audio cues disclosed in the '303 application. In one implementation, a delayed (for example, a pre-recorded) version of the primary channel's current audio signal is presented following the audible tones to prevent any loss of syllables at the beginning of the received message.

FIG. 1 is a block diagram of an embodiment of a communications system 100. The system 100 comprises a communication processing unit 102 that includes a multi-channel radio 106 and an input/output (I/O) module 108 in operative communication with the multi-channel radio 106. In the example embodiment of FIG. 1, the I/O module 108 comprises an auxiliary input 112. In one implementation, the communications processing unit 102 is at least one of an audio concentrator, an audio management unit, a communication management unit, and the like. The communication processing unit 102 comprises at least one of a microprocessor, a microcontroller, a field-programmable gate array (FPGA), a field-programmable object array (FPOA), a programmable logic device (PLD), or an application-specific integrated circuit (ASIC). In one implementation, the multi-channel radio 106 is a multi-mode digital radio (MMDR) configured for aviation communications. The multi-channel radio 106 receives a plurality of communication signals at given frequencies via a multi-channel antenna 104. In the example embodiment of FIG. 1, the multi-channel radio 106 is configured to provide internal audio multiplexing for a plurality of audio input signals received in the processing unit 102.

The system 100 further comprises a control unit 110 and an audio output 114 communicatively coupled to the communications processing unit 102. In one implementation, the control unit 110 is located in an aircraft cockpit and is operable to control the internal audio multiplexing of the multi-channel radio 106, as discussed in further detail below with respect to FIG. 2. The audio output 114 comprises any manner or variety of audio output. For example, the audio output 114 can include, without limitation, a portable receiver, a broadcast receiver, a communications traffic monitor, and any device or system where monitoring of multiple communications signals occurs. In the example embodiment of FIG. 1, the system 100 further comprises a display output 116 in operative communication with the communications processing unit 102. It is understood that the system 100 is capable of accommodating any appropriate number of audio/video output terminals (for example, at least the audio output 114 and the display output 116) in a single system 100.

In operation, once a priority audio signal is detected, the multi-channel radio 106 is configured to transition the priority audio signal to a primary channel substantially simultaneously within the communications processing unit 102, as further described below. For example, the multi-channel radio 106 is operable in a first, non-priority mode to combine a plurality of received audio input signals for output on at least one of the audio channels. In a second (priority) mode, the multi-channel radio 106 transfers the priority audio signal to the primary channel once the priority audio signal is detected. In one implementation, the multi-channel radio 106 receives communications data on more than one channel from the multi-channel antenna 104. For example, a pilot can continue to monitor on radio tower communications on a first non-priority channel to listen to, and contemporaneously receive audio information on a second, separate non-priority channel. It is also possible to receive audio information on more than one channel at a time. For example, the pilot receives weather conditions for multiple locations on at least one secondary channel in order to evaluate weather variation over a geographical area and modify a flight plan, if necessary.

In one implementation, receiving the audio signals from multiple transmitting channels enables the display of various environmental conditions affecting the system 100. For example, through the display output 116, the system 100 displays a present geographical position of an aircraft as well as projected positions of the aircraft. It is duly noted that the multi-channel radio 106 is configured to select from among several audio transmitting broadcasts based on geographical position only, broadcast signal strength only, or a combination of geographical position and signal strength of any one or more additional factors.

Figure 2:
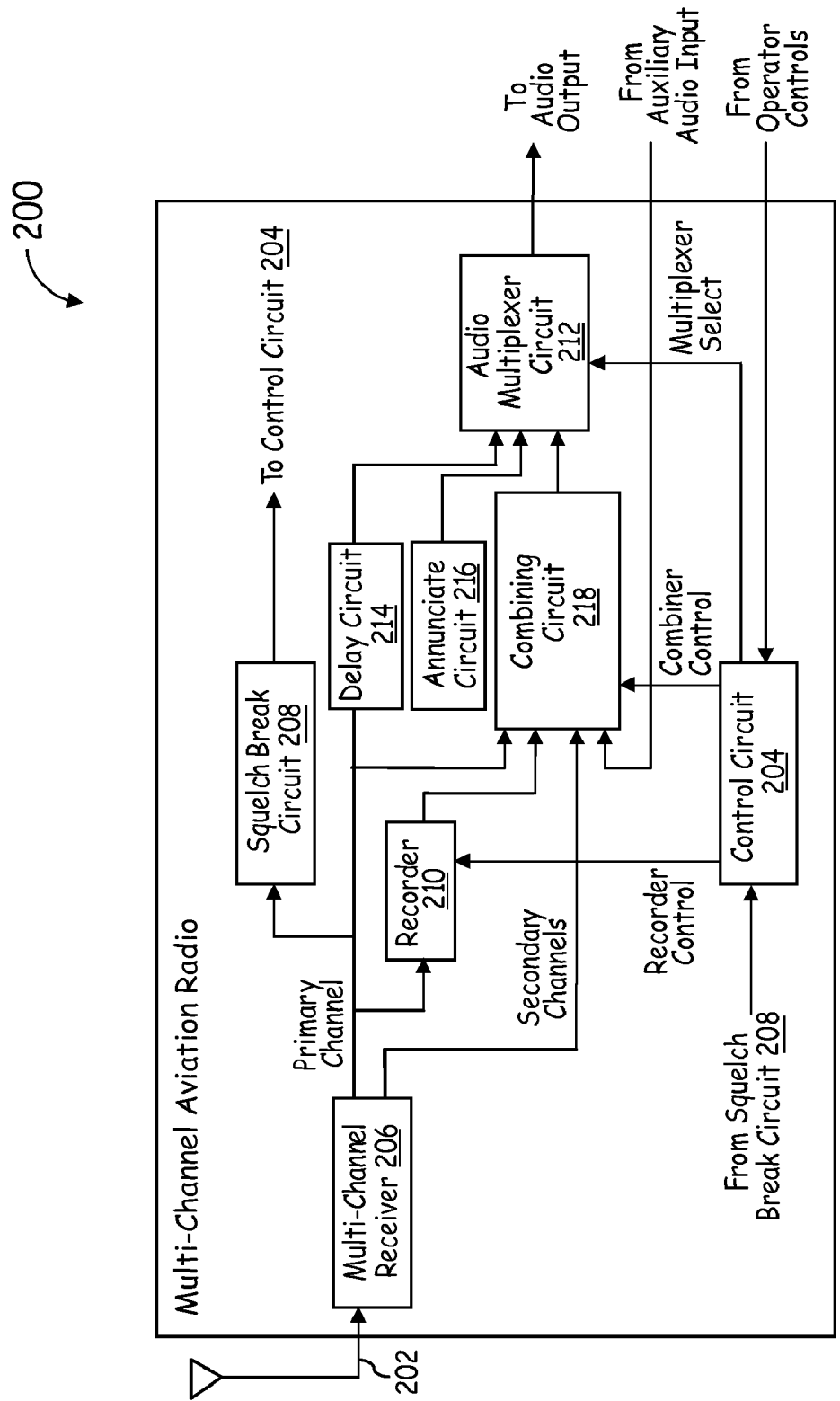
FIG. 2 is a block diagram of a multi-channel aviation radio.

FIG. 2 is a block diagram of a multi-channel aviation radio 200, representative of the communications processing unit 102 of FIG. 1. In the example embodiment of FIG. 2, the multi-channel aviation radio 200 comprises a multi-channel antenna 202, a control circuit 204, and a multi-channel receiver 206 configured to receive a plurality of communication signals from the multi-channel antenna 202. In one implementation, the plurality of communication signals comprises audio input signals. The control circuit 204 is in operative communication with a recorder 210, an audio multiplexer circuit 212, a combining circuit 218 and at least one squelch break circuit 208, each of which are described in further detail below. For ease of description, a single squelch break circuit 208 is illustrated in FIG. 2. It is understood that the multi-channel aviation radio 200 is capable of accommodating individual squelch break circuits 208 for each individual communications channel contemplated for use in the multi-channel aviation radio 200. In one implementation, the control circuit 204 is configured to interrupt playback of recorded audio on one or more secondary channels. Moreover, the control circuit 204 is operable to automatically transition the playback provided by the multi-channel aviation radio 200 to a priority audio signal on (for example) a primary channel. The control circuit 204 is further operable to playback recorded messages, suspend recording, and resume recording using the recorder 210, the combining circuit 218, and the audio multiplexer circuit 212. For example, the control circuit 204 provides a "Multiplexer Select" input to the audio multiplexer circuit 212 and a "Combiner Control" input to the combining circuit 218 as shown in FIG. 2.

As further shown in FIG. 2, each of the at least one squelch break circuit 208 and the combining circuit 218 are in operative communication with the multi-channel receiver 206. For example, the combining circuit 218 is configured to combine the plurality of received audio input signals from the one or more secondary channels with at least one auxiliary audio input signal from an auxiliary audio channel as shown in FIG. 2. In one implementation, the audio multiplexer circuit 212 is configured to select the priority audio signal from the combining circuit 218 for transferring to the primary channel. In this same implementation, the at least one squelch break circuit 208 is configured to suppress at least a portion of the plurality of audio input signals from the multi-channel receiver 206 on the primary channel, as discussed in further detail below with respect to the multiplexing operation of the control circuit 204.

In the example embodiment of FIG. 2, the recorder 210 is communicatively coupled between the multi-channel receiver 206 and the combining circuit 218. The recorder 210 receives a "Recorder Control" input from the control circuit 204. In one implementation, the recorder 210 is configured to record a priority audio transmission on the primary channel, where the recording is activated by the squelch break circuit 208 as shown in FIG. 2. The multi-channel aviation radio 200 further includes a delay circuit 214 and an annunciate circuit 216. The delay circuit 214 is communicatively coupled between the multi-channel receiver 206 and the audio multiplexer circuit 212. In one implementation, the delay circuit 214 is configured to insert audio cues at the beginning of a time-delayed version of the audio transmission provided by the priority audio signal. Moreover, the annunciate circuit 216 is communicatively coupled to the audio multiplexer circuit 212 and configured to provide the audio cues in the first mode of operation once the priority audio signal is detected.

In operation, the combining circuit 218 combines a plurality of received audio input signals for output as a first mode of operation for the multi-channel aviation radio 200. In one implementation, the plurality of audio input signals are combined on at least one channel of the multi-channel aviation radio 200 (for example, at least one of the primary channel or the one or more secondary channels). In this same implementation, the combining circuit 218 sums the combined audio input signals with at least one auxiliary audio input signal, and the summation of audio input signals are transmitted as selected by the audio multiplexer circuit 212 (for example, on at least one of the one or more secondary channels). Once a priority audio signal is detected, the audio multiplexer circuit 212 transfers the priority audio signal onto the primary channel substantially simultaneously within the multi-channel aviation radio 200 as a second mode of operation. In one implementation, the control circuit 204 interrupts playback of any remaining audio inputs signals previously received on the one or more secondary channels with the priority audio signal from the primary channel, as discussed in further detail below. In transferring the priority audio signal to the primary channel, the recorder 210 records a priority audio transmission of the primary channel and provides audio cues in the first mode of operation once the priority audio signal is detected. As discussed above, the recording is activated by the at least one squelch break circuit 208. In one embodiment, the audio cues operate as discussed in the '303 application.

Control Circuit Multiplexing Operation

The audio channels that the combining circuit 218 sums are selected or deselected as instructed by the control circuit 204. The functionality described below is exhibited by the use of the at least two modes that the multi-channel aviation radio 200 is configured to operate in, in addition to a normal operating mode:

I) Non-Priority Mode: The non-priority mode sums the selected received audio input signals without a priority enabled channel (for example, all assigned channels are set as priority disabled).

II) Priority Mode: In the priority mode, one of the assigned channels is set as priority enabled (for example, the primary channel). When in the priority mode, the control circuit 204 mutes all other open audio channels when the primary channel is not squelched. When the primary channel is squelched, the combining circuit 218 is instructed to sum the selected receive audio output signals together (similar to the non-priority mode).

The following section illustrates at least one implementation of the internal multiplexing operation of the control circuit 204. The multi-channel aviation radio 200 is described below in Table 1 as having a single secondary channel and a single recorded message from the auxiliary audio input. For example, one or more operator controls from the control unit 110 of FIG. 1 comprise inputs to the control circuit 204 and are as follows:

Mode: Normal, Monitor, Priority
    Recorder: Play, Stop, Pause
    Background: Secondary Channel, Auxiliary Channel Moreover, outputs from the control circuit 204 to the combining circuit 218 (the "Combiner Control"), the recorder 210 (the "Recorder Control"), and the audio multiplexer circuit 212 (the "Multiplexer Select") will include the following:

Multiplexer Select Combining Circuit, Annunciate, Delay
    Combiner Control No Audio, Select Primary, Select Recorder, Sum Primary and Secondary Channels, Sum Primary and Auxiliary Channels
    Recorder Control Recording, Play, Pause

TABLE 1

Control Circuit Output Modes

| Inputs | | | Modes | | |
|---|---|---|---|---|---|
| Recorder | Background | Squelch? | Normal | Monitor | Priority |
| Play | Secondary | No | Multiplexer Select = Combining Circuit | Multiplexer Select = Combining Circuit | Multiplexer Select = Combining Circuit |
| | | | Combiner Control = Select Recorder | Combiner Control = Select Recorder | Combiner Control = Select Recorder |
| Play | Auxiliary | No | Multiplexer Select = Combining Circuit | Multiplexer Select = Combining Circuit | Multiplexer Select = Combining Circuit |
| | | | Combiner Control = Select Recorder | Combiner Control = Select Recorder | Combiner Control = Select Recorder |
| Stop (Pause) | Auxiliary | No | Multiplexer Select = Combining Circuit | Multiplexer Select = Combining Circuit | Multiplexer Select = Combining Circuit |
| | | | Combiner Control = No Audio | Combiner Control = Auxiliary | Combiner Control = Auxiliary |
| Stop (Pause) | Secondary | No | Multiplexer Select = Combining Circuit | Multiplexer Select = Combining Circuit | Multiplexer Select = Combining Circuit |
| | | | Combiner Control = No Audio | Combiner Control = Secondary | Combiner Control = Secondary |
| Play & Record | Secondary | Yes | Multiplexer Select = Combining Circuit | Multiplexer Select = Combining Circuit | Multiplexer Select = See NOTE 1 |

TABLE 1-continued

Control Circuit Output Modes

| Inputs | | | Modes | | |
|---|---|---|---|---|---|
| Recorder | Background | Squelch? | Normal | Monitor | Priority |
| Play & Record | Auxiliary | Yes | Combiner Control = Select Primary<br>Multiplexer Select = Combining Circuit | Combiner Control = Select Primary<br>Multiplexer Select = Combining Circuit | Combiner Control = No Audio<br>Multiplexer Select = See NOTE 1 |
| Stop (Pause) & Record | Auxiliary | Yes | Combiner Control = Select Primary<br>Multiplexer Select = Combining Circuit | Combiner Control = Select Primary<br>Multiplexer Select = Combining Circuit | Combiner Control = No Audio<br>Multiplexer Select = See NOTE 1 |
| Stop (Pause) & Record | Secondary | Yes | Combiner Control = Select Primary<br>Multiplexer Select = Combining Circuit<br>Combiner Control = Select Primary | Combiner Control = Auxiliary + Primary<br>Multiplexer Select = Combining Circuit<br>Combiner Control = Secondary + Primary | Combiner Control = No Audio<br>Multiplexer Select = See NOTE 1<br>Combiner Control = No Audio |

NOTE 1: This is set to Annunciate for a short time (for example, 250 ms) after start of a squelch break, followed by a delay in the delay circuit 214, where delay time = annunciate time for the annunciate circuit 216.
NOTE 2: The annunciate signal can comprise any pre-recorded signal (for example, a 1 KHz tone representing an audio cue).

Figure 3:
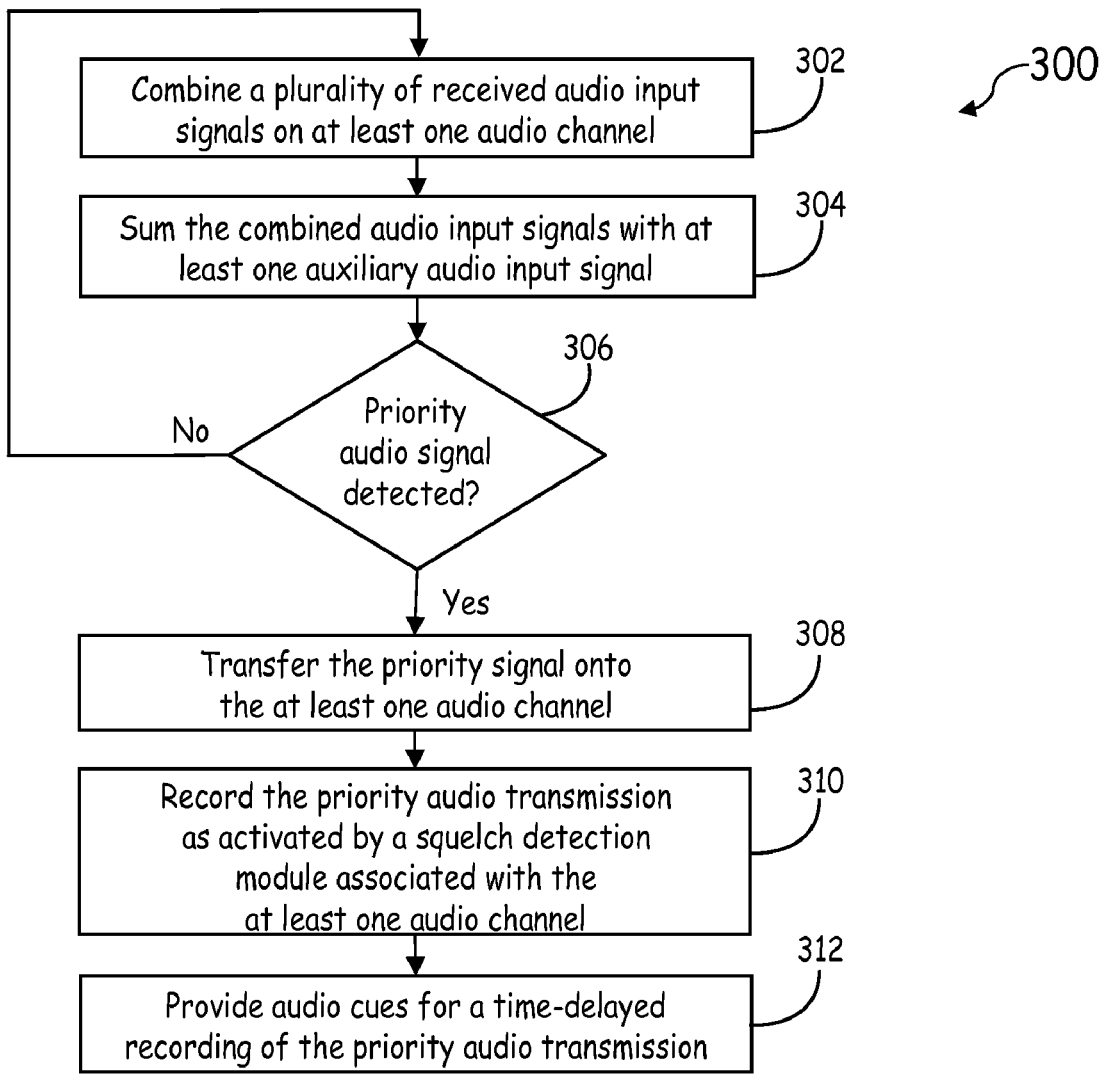
FIG. 3 is a flow diagram of a method of providing audio transmissions from an electronic device having internal audio multiplexing.

FIG. 3 is a flow diagram of a method 300 of providing audio transmissions from an electronic device (for example, a multi-channel radio similar to the radio 200 of FIG. 2). The method 300 addresses providing at least one form of internal audio multiplexing for a plurality of audio input signals received in the electronic device. In one embodiment, the at least one form of internal audio multiplexing comprises operating the electronic device in at least one of a monitor mode and a priority mode. In one implementation of the example embodiment of FIG. 3, the monitor mode combines the plurality of audio input signals for output on at least one audio channel. Moreover, the priority mode transfers the priority audio signal to the at least one audio channel substantially simultaneously within the electronic device once the priority audio signal is detected.

In the example embodiment of FIG. 3, the electronic device combines the plurality of received audio input signals on at least one primary channel (block 302). In one implementation, the electronic device sums the combined audio input signals with at least one auxiliary audio input signal (block 304). Moreover, the summation of audio input signals can be transmitted on one or more secondary channels of the electronic device. When a priority audio signal is detected (block 306), the electronic device transfers the priority audio signal onto the at least one primary channel (block 308). In one implementation, the electronic device provides audio cues in the first mode of operation once the priority audio signal is detected. The electronic device records the priority audio transmission as activated by a squelch detection module associated with the at least one primary channel (block 310). In one implementation, recording the priority audio transmission on the at least one audio channel further comprises interrupting playback of the remaining audio input signals with the priority audio signal. For example, the electronic device will insert the audio cues at the beginning of (that is, preceding) a time-delayed recording of the priority audio transmission (block 312).

The methods and techniques described here may be implemented in digital electronic circuitry, or with firmware or software in a programmable processor (for example, a special-purpose processor or a general-purpose processor such as a computer), or in combinations of them. An apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory (ROM) and/or a random access memory (RAM).

Storage devices suitable for tangibly embodying computer program instructions and data include all forms of non-volatile memory, including by way of example semiconductor memory devices, such as (electrically) erasable programmable read-only memory (EPROM or EEPROM), and flash memory devices; magnetic disks such as internal hard disks and removable disks; and magneto-optical disks, including but not limited to digital video disks (DVDs). Any of the foregoing may be supplemented by, or incorporated in, specially-designed application-specific integrated circuits (ASICs), and the like.

While the embodiments disclosed have been described in the context of an internal audio multiplexing system for multi-channel radios, the apparatus embodying these techniques are capable of being distributed in the form of a machine-readable medium of instructions and a variety of program products that apply equally regardless of the particular type of signal bearing media actually used to carry out the distribution. Examples of transmission-type media include digital and analog communications links and wired or wireless communications links using transmission forms, such as (for example) radio frequency and light wave transmissions.

This description has been presented for purposes of illustration, and is not intended to be exhaustive or limited to the embodiments disclosed. Variations and modifications may occur, which fall within the scope of the following claims.

What is claimed is:

1. A method of providing audio transmissions from an electronic device having internal audio multiplexing, the method comprising:
   combining a plurality of received audio input signals for output as a first mode of operation for the electronic device, the electronic device configured to output the plurality of audio input signals on at least one audio channel; and
   when a priority audio signal is detected from one of the received audio input signals in the first mode of operation,
      interrupting playback of the remaining audio input signals with the priority audio signal as a second mode of operation for the electronic device,
      providing audio cues in the first mode of operation once the priority audio signal is detected,
      inserting the audio cues preceding a time-delayed recording of the audio transmission provided on the priority audio signal, and
      within the electronic device, transferring the priority audio signal to the at least one audio channel once the priority audio signal is detected.

2. The method of claim 1, wherein combining the plurality of received audio input signals comprises summing the combined audio input signals with at least one auxiliary audio input signal.

3. The method of claim 1, wherein interrupting the playback of the remaining audio input signals further comprises recording an audio transmission of the priority audio signal transmitted on the at least one audio channel, the recording activated by a squelch detection module associated with the at least one audio channel.

4. An aviation communications system, comprising:
   a communications processing unit, including:
      a multi-channel radio, the multi-channel radio configured to provide internal audio multiplexing for a plurality of audio channels in the processing unit, wherein the multi-channel radio is operable to:
         in a monitor mode, combine a plurality of received audio input signals for output on at least one of the audio channels, and
         in a priority mode, when a priority audio signal is detected, transfer the priority audio signal onto a primary channel of the plurality of audio channels; and
      wherein the multi-channel radio comprises a recorder configured to record a priority audio transmission on the primary channel, the recording activated by squelch detection circuitry associated with the primary channel;
      an input/output module in operative communication with the multi-channel radio; and
   a control unit communicatively coupled to the communication processing unit, the control unit operable to control the internal audio multiplexing of the multi-channel radio;
   wherein once the priority audio signal is detected, the multi-channel radio is configured to automatically transition the priority audio signal to the primary channel within the communications processing unit.

5. The system of claim 4, wherein the multi-channel radio comprises:
   a multi-channel antenna;
   a multi-channel receiver configured to receive a plurality of communication input signals from the multi-channel antenna;
   at least one squelch break circuit in operative communication with the multi-channel receiver, the at least one squelch break circuit configured to suppress at least a portion of the plurality of audio input signals on the primary channel;
   a combining circuit in operative communication with the multi-channel receiver, the combining circuit configured to combine the plurality of received audio input signals with at least one auxiliary audio input signal, wherein at least a portion of the combined audio inputs signals are received on one or more secondary channels of the multi-channel radio; and
   an audio multiplexer circuit in operative communication with the combining circuit, the audio multiplexer circuit configured to select the priority audio signal for transferring to the primary channel.

6. The system of claim 5, wherein the multi-channel radio further comprises:
   a delay circuit communicatively coupled between the multi-channel receiver and the audio multiplexer circuit, the delay circuit configured to insert audio cues at the beginning of a time-delayed version of the priority audio transmission; and
   an annunciate circuit communicatively coupled to the audio multiplexer circuit, the annunciate circuit configured to provide the audio cues for the priority mode once the priority audio signal is detected.

7. The system of claim 5, wherein the multi-channel radio further comprises a control circuit in operative communication with at least the combining circuit and the at least one squelch break circuit, the control circuit configured to interrupt playback of any remaining audio inputs signals previously received on the one or more secondary channels with the priority audio signal from the primary channel.

8. The system of claim 4, wherein the multi-channel radio is a multi-mode digital radio (MMDR).

9. The system of claim 4 and further comprising a display output in operative communication with the communications processing unit.

10. The system of claim 4 and further comprising an audio output configured to receive a plurality of audio output signals from the input/output module.

11. The system of claim 4, wherein the input/output module comprises an auxiliary input.

12. The system of claim 4, wherein the communications processing unit comprises at least one of a microprocessor, a microcontroller, a field-programmable gate array, a field-programmable object array, a programmable logic device, or an application-specific integrated circuit.

13. The system of claim 4, wherein the control unit is located in an aircraft cockpit.

14. A computer program product comprising program instructions, embodied on a machine-readable storage medium, the program instructions causing at least one programmable processor in a multi-channel radio to:
   combine a plurality of received audio input signals for output to at least one communications receiver system, the plurality of audio input signals combined on at least one channel of the multi-channel radio; and
   when a priority audio signal is detected,
      transfer the priority audio signal onto a primary channel within the multi-channel radio,
      activate recording of a priority audio transmission on the primary channel, the priority audio transmission associated with the priority audio signal, and
      interrupt playback of the previously combined audio input signals remaining on one or more secondary channels of the multi-channel radio with the priority audio input signal from the primary channel.

15. The computer program product of claim 14, wherein the program instructions that combine the plurality of received audio input signals for output as a first mode of operation for the multi-channel radio cause the at least one programmable processor to sum the combined audio input signals with at least one auxiliary audio input signal.

16. The computer program product of claim 15, wherein the program instructions that combine the plurality of received audio input signals for output as a first mode of operation for the multi-channel radio further cause the at least one programmable processor to transmit the summation of audio input signals on at least one of the one or more secondary channels.

17. The computer program product of claim 14, wherein the program instructions that transfer the priority audio input signal onto the at least one primary channel further cause the at least one programmable processor to:

provide audio cues over the at least one channel once the priority audio signal is detected.

18. The computer program product of claim 17, wherein the program instructions that provide the audio cues cause the at least one programmable processor to insert the audio cues at the beginning of a time-delayed version of the priority audio transmission.

* * * * *